(12) United States Patent
Salter et al.

(10) Patent No.: US 11,679,709 B2
(45) Date of Patent: Jun. 20, 2023

(54) SLIDABLE VEHICLE CROSSBARS AND CARGO HOLDING METHOD

(71) Applicant: Ford Global Technologies, LLC, Dearborn, MI (US)

(72) Inventors: Stuart C. Salter, White Lake, MI (US); William Wurz, San Francisco, CA (US); David Brian Glickman, Southfield, MI (US); Pietro Buttolo, Dearborn Heights, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 17/458,959

(22) Filed: Aug. 27, 2021

(65) Prior Publication Data
US 2023/0063296 A1  Mar. 2, 2023

(51) Int. Cl.
*B60P 7/02* (2006.01)
*B60P 7/04* (2006.01)
*B60P 7/15* (2006.01)

(52) U.S. Cl.
CPC ...... *B60P 7/02* (2013.01); *B60P 7/04* (2013.01); *B60P 7/15* (2013.01)

(58) Field of Classification Search
CPC ...... B60P 7/02; B60P 7/04; B60P 7/15; B60P 7/06; B60P 7/13; B60P 7/135; B62D 33/02; B60R 9/06; B60R 2011/004
USPC .............. 296/3, 37.6, 118, 104, 105, 100.11, 296/100.12, 100.17, 100.18
See application file for complete search history.

(56) References Cited

U.S. PATENT DOCUMENTS

| | | | | |
|---|---|---|---|---|
| 5,002,324 A | | 3/1991 | Griffin | |
| 5,056,855 A | * | 10/1991 | Moravsky | B60J 7/104 296/105 |
| 5,393,114 A | * | 2/1995 | Christensen | B60R 9/00 296/3 |
| 5,494,327 A | * | 2/1996 | Derecktor | B60P 3/40 224/544 |
| 6,257,260 B1 | * | 7/2001 | Phillips | B62D 25/06 296/105 |
| 7,100,961 B2 | * | 9/2006 | Moen | B60J 7/102 135/88.13 |
| 7,261,362 B1 | * | 8/2007 | Mendez | B60J 7/064 296/100.09 |
| 7,497,493 B1 | * | 3/2009 | Thiessen | B60P 7/15 296/3 |
| 9,539,928 B2 | | 1/2017 | Singer | |
| 9,586,629 B2 | | 3/2017 | Leitner | |
| 10,800,340 B1 | * | 10/2020 | Mayville | B60R 9/06 |
| 10,899,205 B1 | * | 1/2021 | Knight | B60J 7/102 |
| 2002/0093216 A1 | * | 7/2002 | Ananian | B60J 7/062 296/105 |

(Continued)

FOREIGN PATENT DOCUMENTS

GB  2436820 B  3/2008

*Primary Examiner* — Gregory A Blankenship
(74) *Attorney, Agent, or Firm* — Vichit Chea; Carlson, Gaskey & Olds, P.C.

(57) ABSTRACT

A vehicle assembly includes, among other things, a cargo bed of a vehicle, a first crossbar spanning the cargo bed, and a second crossbar spanning the cargo bed. The first and second crossbars are slidable relative to the cargo bed. The first and second crossbars are slidable relative to each other.

18 Claims, 7 Drawing Sheets

(56) References Cited

U.S. PATENT DOCUMENTS

| | | | |
|---|---|---|---|
| 2006/0017303 A1 | 1/2006 | Weege et al. | |
| 2006/0093454 A1* | 5/2006 | Kmita | B60P 7/15 410/150 |
| 2007/0110539 A1* | 5/2007 | Klinkman | B60P 7/15 410/150 |
| 2008/0038075 A1* | 2/2008 | Aftanas | B60P 7/0815 410/150 |
| 2008/0143133 A1* | 6/2008 | Nichols | B60P 7/0815 296/136.03 |
| 2009/0072576 A1* | 3/2009 | LeBlanc | B60J 7/062 296/100.12 |
| 2016/0243975 A1* | 8/2016 | Singer | B60J 7/062 |
| 2017/0334274 A1* | 11/2017 | Acosta Loyola | B60P 7/04 |
| 2017/0349037 A1* | 12/2017 | Singer | B60J 7/041 |
| 2018/0126896 A1* | 5/2018 | Embleton | B65D 90/0006 |
| 2019/0105971 A1* | 4/2019 | Singer | B60J 7/102 |
| 2019/0256156 A1* | 8/2019 | Schuling | B60R 9/06 |
| 2020/0148281 A1* | 5/2020 | Elder | B60R 9/12 |
| 2020/0207194 A1* | 7/2020 | Donkin | B60J 1/14 |
| 2021/0086703 A1* | 3/2021 | Huisman | B60P 7/0815 |
| 2022/0324522 A1* | 10/2022 | Kiefer, IV | B62D 33/0207 |

* cited by examiner

SLIDABLE VEHICLE CROSSBARS AND CARGO HOLDING METHOD

TECHNICAL FIELD

This disclosure relates generally to crossbars of a vehicle and, more particularly, to a crossbars that can slide relative to each other between forward and rearward positions.

BACKGROUND

Many vehicles, such as pickup trucks, include a cargo bed. Various structures have been utilized to help secure and manage loads held within the cargo bed.

SUMMARY

A vehicle assembly according to an exemplary aspect of the present disclosure includes, among other things, a cargo bed of a vehicle, a first crossbar spanning the cargo bed, and a second crossbar spanning the cargo bed. The first and second crossbars are slidable relative to the cargo bed. The first and second crossbars are slidable relative to each other.

In another example of the foregoing vehicle assembly, a passenger side rail is mounted to a passenger side wall assembly of the cargo bed, and a driver side rail is mounted to a driver side wall assembly of the cargo bed. The first and second crossbars are each slidably coupled to both the driver side rail and the passenger side rail.

Another example of the foregoing vehicle assemblies includes the passenger and driver side wall assemblies. The passenger and driver side wall assemblies each have an inner side, an outer side, and an upper side. The passenger side rail is mounted directly to the passenger side wall assembly. The driver side rail is mounted directly to the driver side wall assembly.

In another example of any of the foregoing vehicle assemblies, the passenger side rail and the driver side rail are disposed vertically beneath the upper sides of the passenger and driver side wall assemblies.

In another example of any of the foregoing vehicle assemblies, the first and second crossbars are each slidable along the passenger and driver side rails between a forward position and a rearward position. The crossbars closer to a cab of the vehicle when the crossbars are in the forward position than when the crossbars are in the rearward position.

Another example of any of the foregoing vehicle assemblies includes a control module and an actuator assembly. The control module is configured to control the actuator assembly to reposition the first and second crossbars.

In another example of any of the foregoing vehicle assemblies, the actuator assembly is configured to reposition the first and second crossbars to hold a load between the first and second crossbars.

In another example of any of the foregoing vehicle assemblies, the first and second crossbars pinch the load to hold the load.

Another example of any of the foregoing vehicle assemblies includes a radar device configured to scan the load. The actuator assembly is configured to reposition the first and second crossbars based at least in part on information from the radar device.

In another example of any of the foregoing vehicle assemblies, the radar device is disposed on the cargo crossbar.

Another example of any of the foregoing vehicle assemblies includes a cover connected to the first and second crossbars. The cover is configured to expand as the first crossbar moves relatively away from the second crossbar. The cover is configured to retract as the first crossbar moves relatively toward the second crossbar.

In another example of any of the foregoing vehicle assemblies, the cover is fabric.

In another example of any of the foregoing assemblies, the first and second crossbars have a U-shaped profile.

A vehicle cargo bed load holding method according to another exemplary aspect of the present disclosure includes, among other things, slidably coupling a first crossbar to a passenger side rail and a driver side rail, slidably coupling a second crossbar to the passenger side rail and the driver side rail, and sliding the first and second crossbars relative to each other to secure a load between the first and second crossbars. The load is disposed within a cargo bed of a vehicle.

Another example of the foregoing method includes pinching the load between the first and second crossbars.

In another example of any of the foregoing methods, the sliding includes sliding both the first crossbar and the second crossbar.

Another example of any of the foregoing methods includes supporting a cover on both the first and second crossbar. The cover expands when the first and second crossbars move relatively away from each other. The cover retracts when the first and second crossbars move relatively closer to each other.

Another example of any of the foregoing methods includes sliding the crossbars over a cargo bed of the vehicle when moving the crossbars between the forward position and the rearward position.

Another example of any of the foregoing methods includes automatically positioning the first crossbar and the second crossbar based on a position of the load.

Another example of any of the foregoing methods includes automatically sliding the first and second crossbars.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details crossbars utilized in connection with a cargo bed of a vehicle. The crossbars can be slidably coupled to rail assemblies. The crossbars can be repositioned relative to each other by sliding the crossbars along the rail assemblies. The positioning and sliding of the crossbars along the rail assemblies can be automatic.

Figure 1:
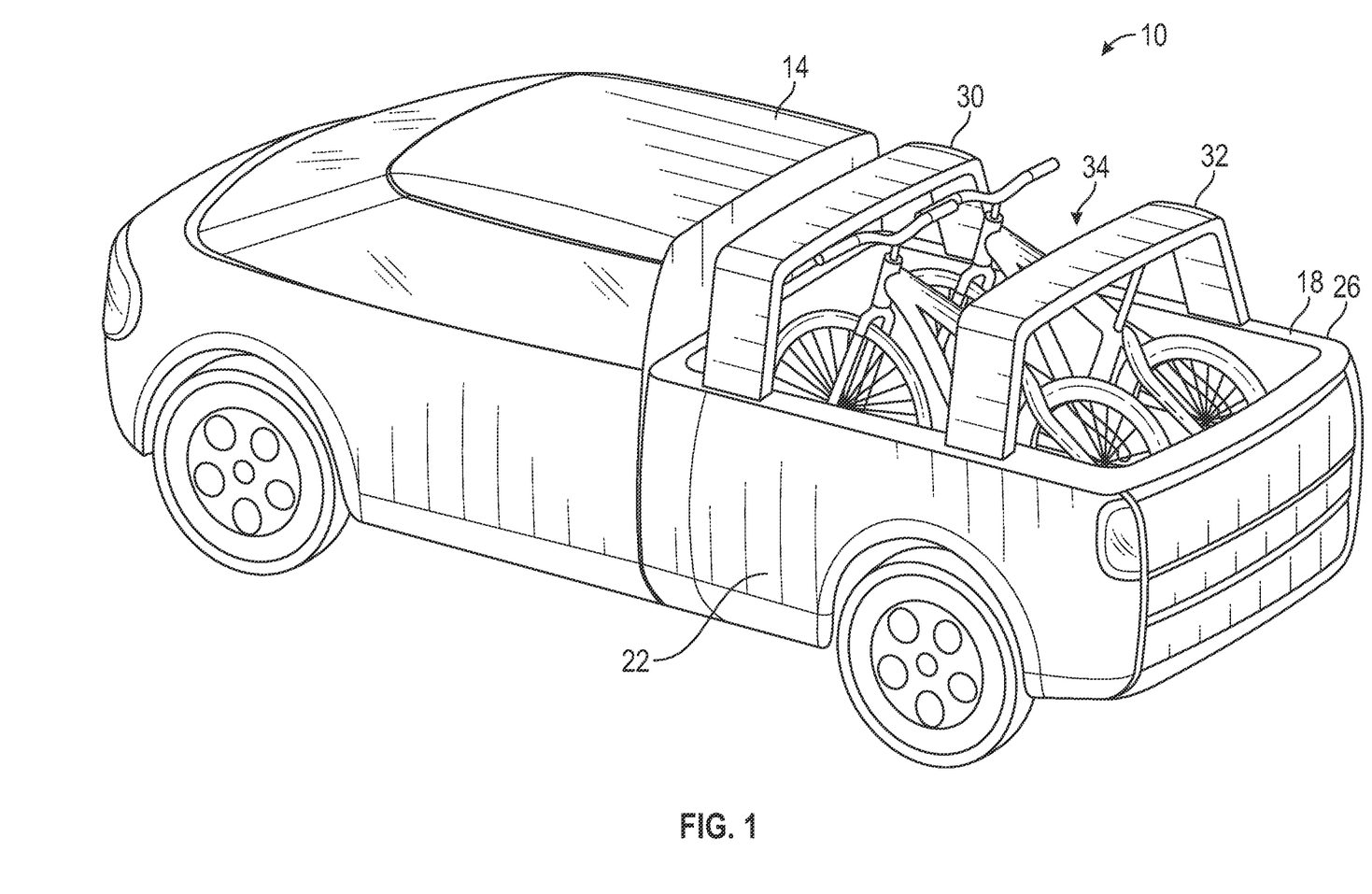
FIG. 1. illustrates a perspective view of a vehicle having a cargo bed, a crossbar, and another crossbar.

With reference to FIG. 1, an exemplary vehicle 10 includes a cab 14 and a cargo bed 18 that is aft the cab 14. The vehicle 10 is a pickup truck in this example.

The cargo bed 18 includes a driver side wall assembly 22 and a passenger side wall assembly 26. A first crossbar 30 extends from the driver side wall assembly 22, over the cargo bed 18, to the passenger side wall assembly 26. A second crossbar 32 extends from the driver side wall assembly 22, over the cargo bed 18, to the passenger side wall assembly 26. The crossbars 30, 32 can be utilized to secure a load 34 within the cargo bed 18. The load 34 can be tied to the crossbars 30, 32 for example. In the exemplary embodiment, the first and second crossbars have a U-shaped profile.

Figure 2:
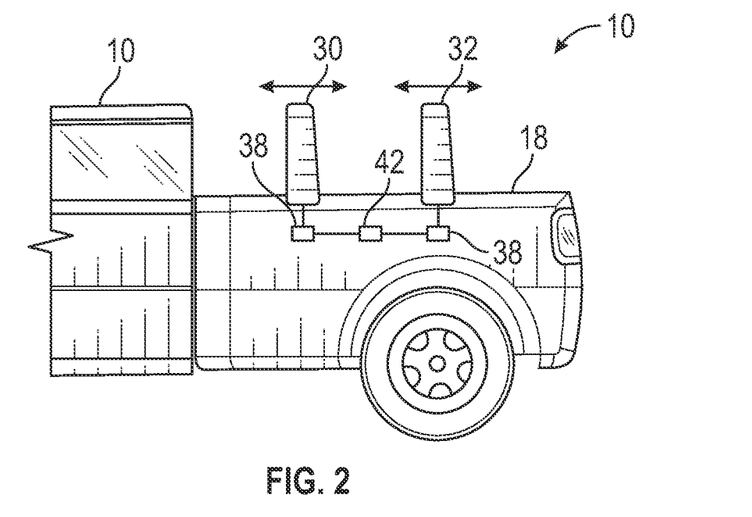
FIG. 2 illustrates a side view of a portion of the vehicle in FIG. 1.

With reference to FIG. 2, the crossbars 30, 32 can be repositioned by sliding between forward positions and rearward positions along a length of the cargo bed 18. The crossbars 30, 32 can be moved relative to each other. The crossbars 30, 32 can be repositioned to, for example, facilitate securing load 34. The first and second crossbars 30, 32 are slidable relative to the cargo bed 18. The first and second crossbars 30, 32 are slidable relative to each other.

The vehicle 10, in this example, includes an actuator assembly 38 and a control module 42. In response to commands from the control module 42, the actuator assembly 38 can move the crossbars 30, 32 forward and aft along the cargo bed 18.

The control module 42 is shown schematically in FIG. 2. It should be understood that the control module 42 may include hardware and software, and could be part of an overall vehicle control module, such as a battery on-board control module, or vehicle system controller (VSC), or could alternatively be a standalone controller separate from VSC.

In an example embodiment, some of the operations of the control module 42 described herein may be performed by separate control modules, such as the on-board control module, and vehicle control module. In this regard, the control module 42 may include one or more of an on-board control module and vehicle control module.

The control module 42 can be programmed with executable instructions for interfacing with and operating the various components of the vehicle 10. The control module 42 can include a processing unit and non-transitory memory for executing the various control strategies and modes. In an example, the control module 42 includes, as memory, electrically erasable programmable read-only memory (EEPROM), which is a type of non-volatile memory often used in computers and remote keyless systems. EEPROMs can be programmed and erased in circuit by applying special programming signals, which may be sent by the control module 42.

In an example, the actuator assembly 38 includes at least one motor within the driver side wall assembly 22 and at least one motor within the passenger side wall assembly 26. The motors can be used to drive forward and rearward movements of the crossbars 30, 32. The motors may include a mechanical break to hold a position of the crossbars 30, 32.

In particular, the actuator assembly 38 associated with the driver side wall 22 can comprise a DC motor that drives a screw mechanism through a set of reduction gears. The driving or rotating of the screw mechanism by the DC motor moves a platform or base along the driver side wall 22. The crossbar 30 is secured directly to the platform or base. Another DC motor, screw mechanism, and set of reduction gears are associated with the passenger side wall 22 and used to drive the passenger side of the crossbar. While an exemplary type of actuator assembly 38 is described above, other options for moving the crossbar 30 are contemplated and fall within the scope of this disclosure.

The actuator assembly 38 can be activated by the control module 42 in response to a command from a user. The command causes the actuator assembly 38 to move one or both of the crossbars 30, 32. The command may be sent through a smart device, such as a smart phone. In another example, the user interacts with a touchscreen inside the cab 14 to cause the control module to initiate the command.

Figure 3:
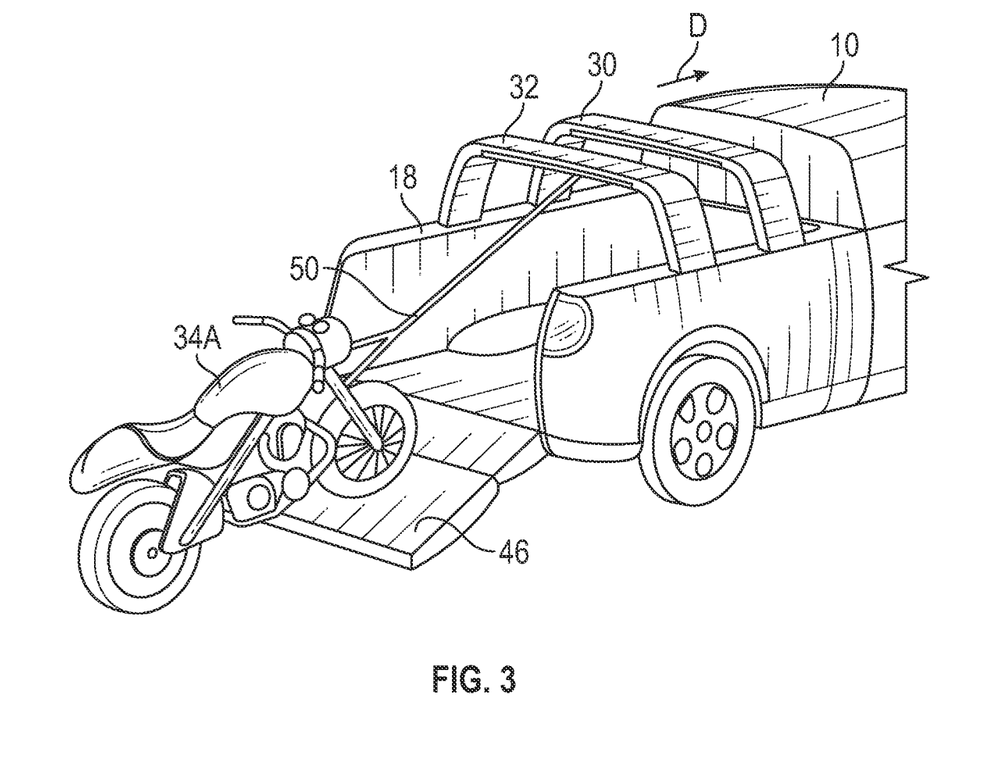
FIG. 3 illustrates a perspective view of a portion of the vehicle of FIG. 1 as one of the crossbars is being used to help move a load into the cargo bed.

With reference to FIG. 3, the crossbars 30, 32 can, in some examples, be moved to help move a load 34A into the cargo bed 18. In this example, a tailgate 46 of the vehicle 10 is first lowered. The load 34A is then tethered to one or more of the crossbars 30, 32 utilizing a rope or cable 50. Next, the actuator assembly 38 is activated to move the one or more of the crossbars 30, 32 forward in the direction D, which pulls the cable 50 to pull the load 34A up the tailgate 46 into the cargo bed 18.

In some examples, a winch could be used to retract the cable 50 rather than relying only on movement of the crossbar 30. The winch could be coupled to the crossbar 30, and a pulley mounted to crossbar 32 could be used to guide the cable 50 as the winch pulls the cable. The pully can improve mechanical advantage and can allow the winch to increase pull without damaging the crossbars 30, 32.

Figure 4:
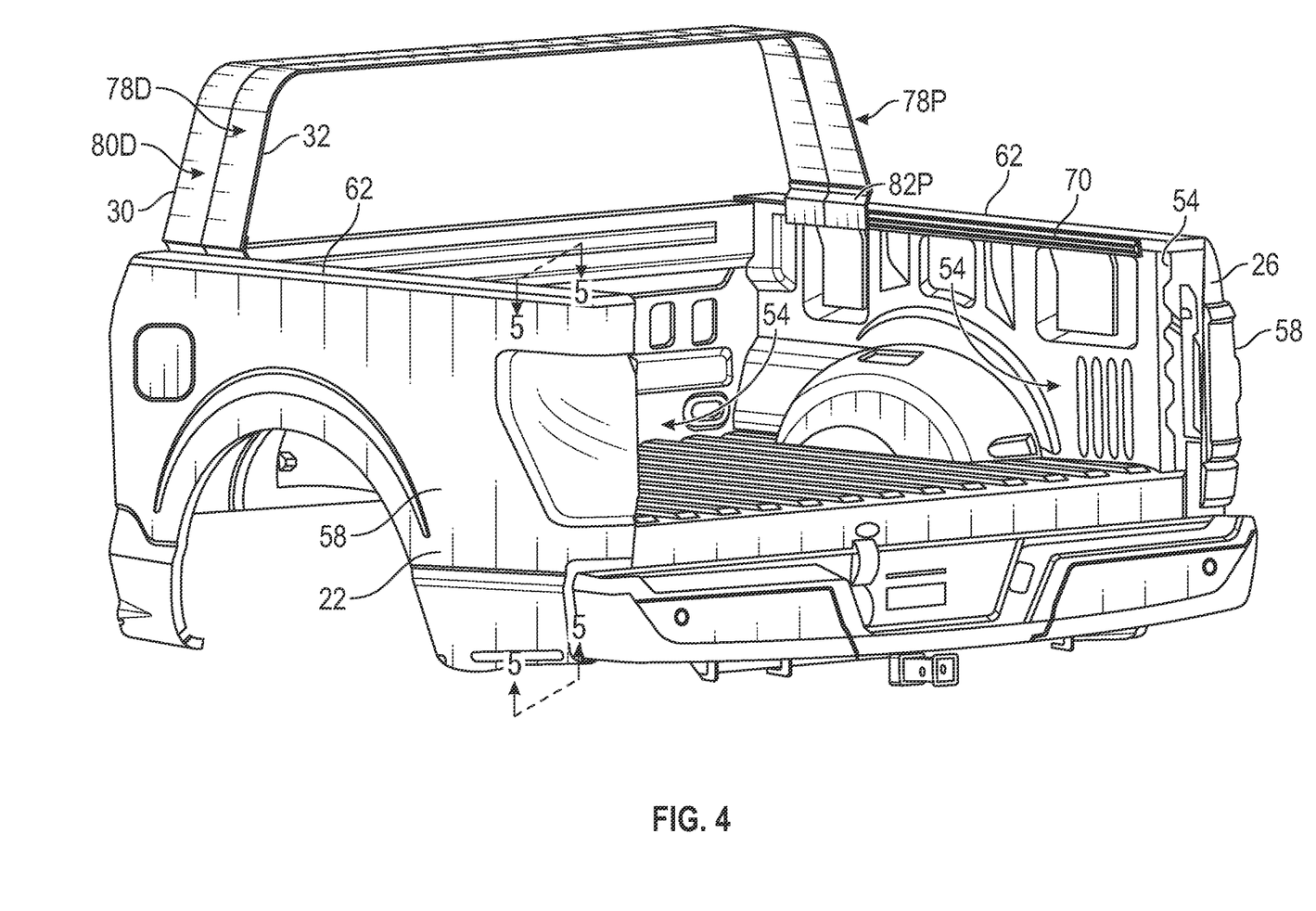
FIG. 4 illustrates a perspective view of the crossbars and cargo bed of FIG. 1 with selected portions removed.
Figure 5:
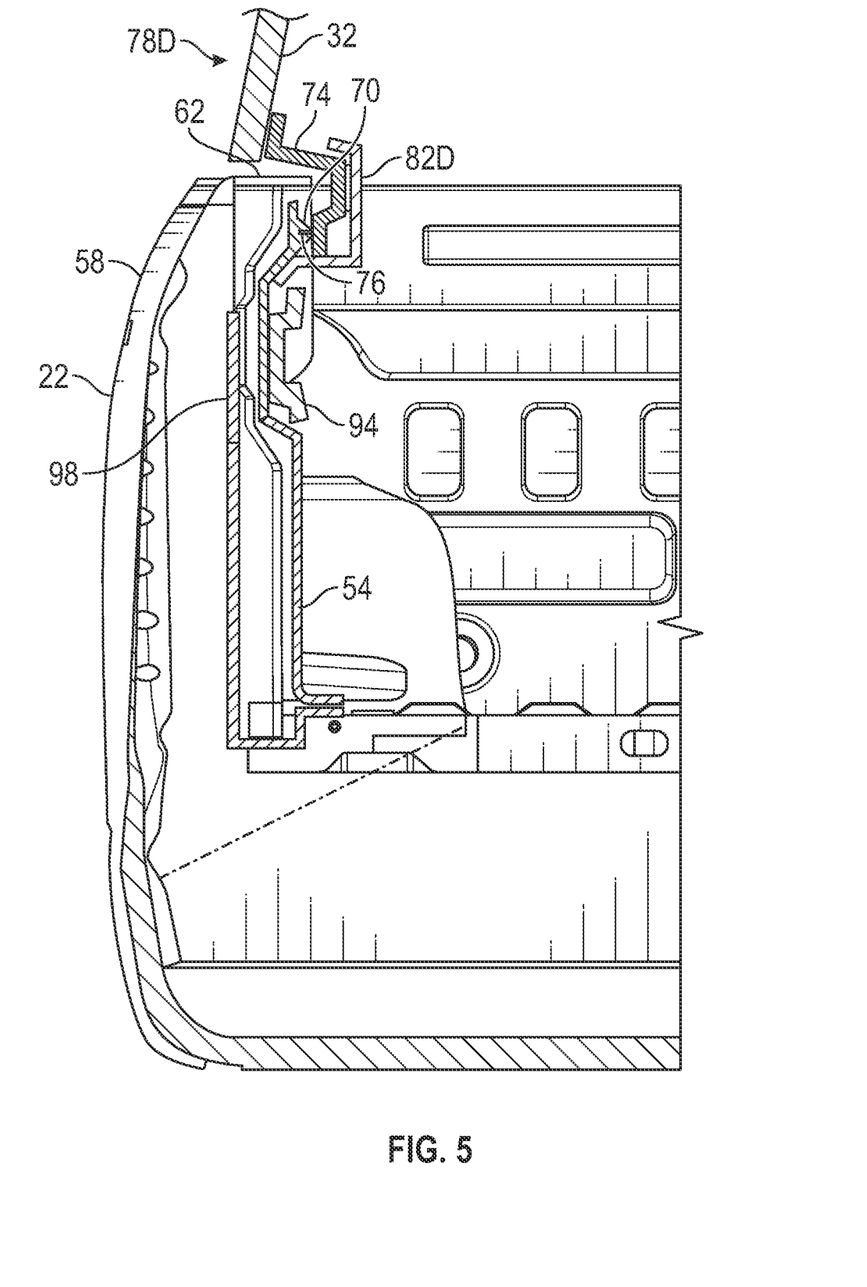
FIG. 5 illustrates a section view taken at line 5-5 in FIG. 4.

With reference now for FIGS. 4 and 5, the driver side wall assembly 22 and the passenger side wall assembly 26 each include an inner side 54, an outer side 58, and an upper side 62. A rail assembly 70 is mounted to the inner side 54 of the driver side wall assembly 22. Another rail assembly 70 is mounted to the inner side 54 of the passenger side wall assembly 26.

To slidably couple the crossbar 32 to the rail assemblies 70, a driver side mounting bracket 74D couples an end portion 78D of the crossbar 32 to the driver side rail assembly 70. A passenger side mounting bracket couples a passenger side end portion 78P of the crossbar 32 to the passenger side rail assembly 70.

The driver side mounting bracket 74D has a portion slidably coupled to the driver side rail assembly 70. The passenger side mounting bracket has a portion slidably coupled to the passenger side rail assembly 70. In this example, the mounting bracket 74D engages with the rail assembly 70 through a roller and bushing assembly 76, which can transfer a load from the crossbar 32 to the respective rail assembly 70.

A cover 82D conceals at least part of the mounting bracket 74D and the roller and bushing assembly 76. The cover 82D can help to protect these components from dirt and damage The cover 82D can allow wiring (e.g., wiring used to power the actuator assembly 38) to travel in a manner similar to that of a sliding door on conventional vehicles while protecting the wiring. Another cover 82P conceals at least part of the mounting bracket on the passenger side along with the associated roller and bushing assembly.

The crossbar 30 is slidably coupled to the rail assemblies 70 through mounting brackets that are, in this example, configured similarly to the mounting bracket 74D that couples the end portion 78D to the rail assembly 70, and the mounting bracket 74P that couples the end portion 78P to the rail assembly 70.

The rail assemblies 70 can mount directly to the inner sides 54 of the driver side wall assembly 22 and the passenger side wall assembly 26. The rail assemblies 70 may mount to existing cargo management tie down locations and structural parts for automobiles sold under the BOXLINK® name.

In the exemplary embodiment, the rail assemblies 70 are mounted such that the rail assemblies 70 are vertically beneath the upper sides 62 of the driver side wall assembly 22 and the passenger side wall assembly 26. This helps to hide the rail assemblies 70 from view. All portions of the crossbars 30, 32 in this example, are vertically above the upper sides 62. Vertical, for purposes of this disclosure, is with reference to ground and an ordinary orientation of the vehicle 10 during operation.

In this example, with reference to FIG. 5, the rail assembly 70 is mounted to the inner side 54 of the driver side wall assembly 22. After which, a tie down 94 can be secured to the inner side 54 and the rail assembly 70. The tie down 94 can be used to help secure a load within the cargo bed 18.

In this example, reinforcement structures 98 are used to reinforce the inner sides 54 of the driver side wall assembly 22 and the passenger side wall assembly 26. The reinforcement structures 98 can be referred to as doublers. The reinforcement structures 98 strengthen the areas of the driver side wall assembly 22 and the passenger side wall assembly 26, particularly the areas where the rail assemblies 70 are attached.

Some vehicles have outer sides 58 that are removable. In such vehicles, the outer side can be removed from the driver side wall assembly 22 to permit the reinforcement structures 98 to be attached to the backside of the inner side 54 of the passenger side wall assembly 22. In vehicles without removable outer sides, the outer side 58 can include openings to permit access and clearances necessary to install the reinforcement structures 98.

Figure 6:
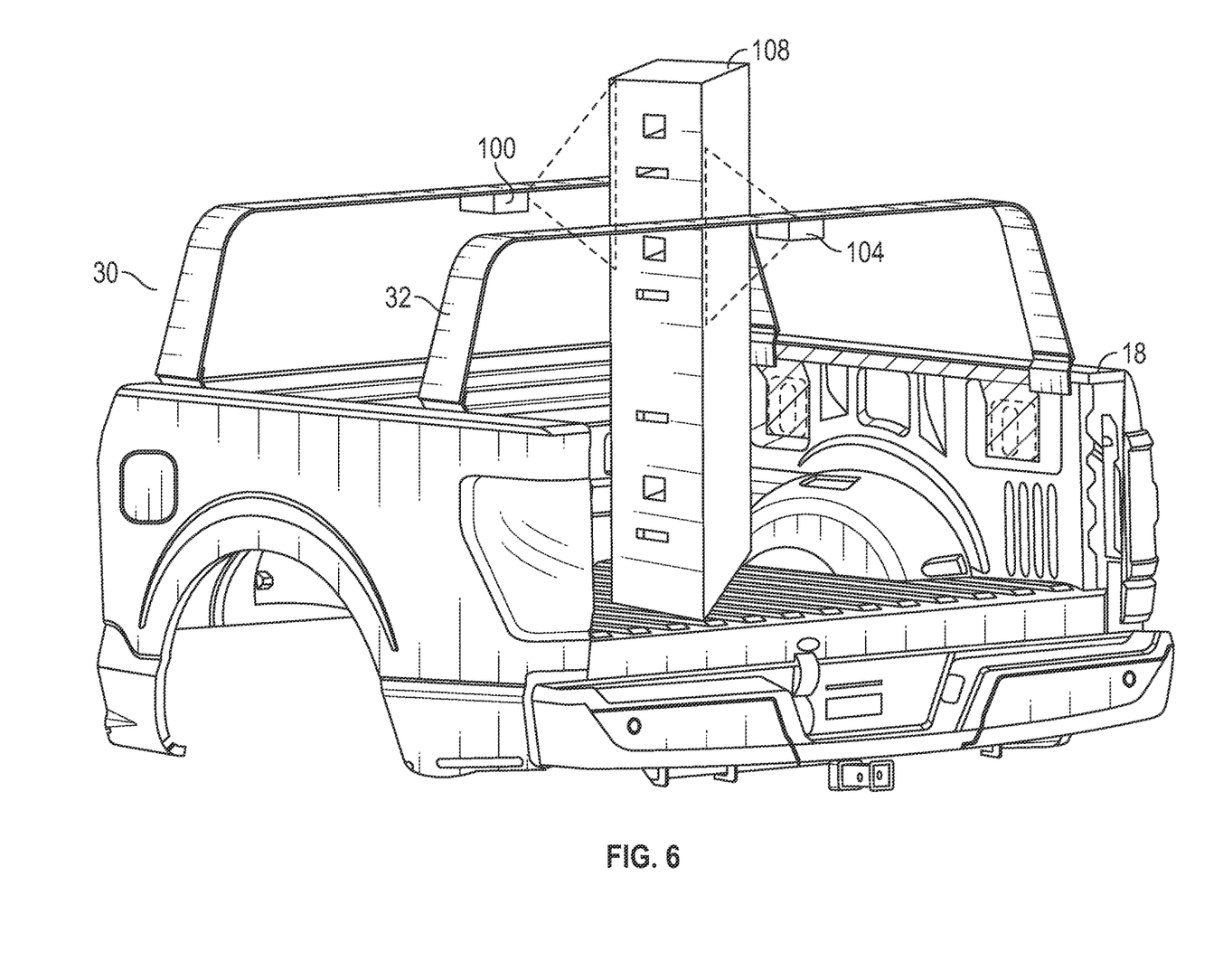
FIG. 6 illustrates a perspective view of the cargo bed and crossbars when the crossbars are used to secure a load.

With reference now to FIG. 6, in an embodiment, at least one sensor assembly 100 is mounted to the crossbar 30, and at least one sensor assembly 104 is mounted to the crossbar 32. The sensor assemblies 100, 104 can be sentinel radar sensors. The sensors assemblies 100, 104 can be used to detect a position of a load 108 within the cargo bed 18.

Figure 7:
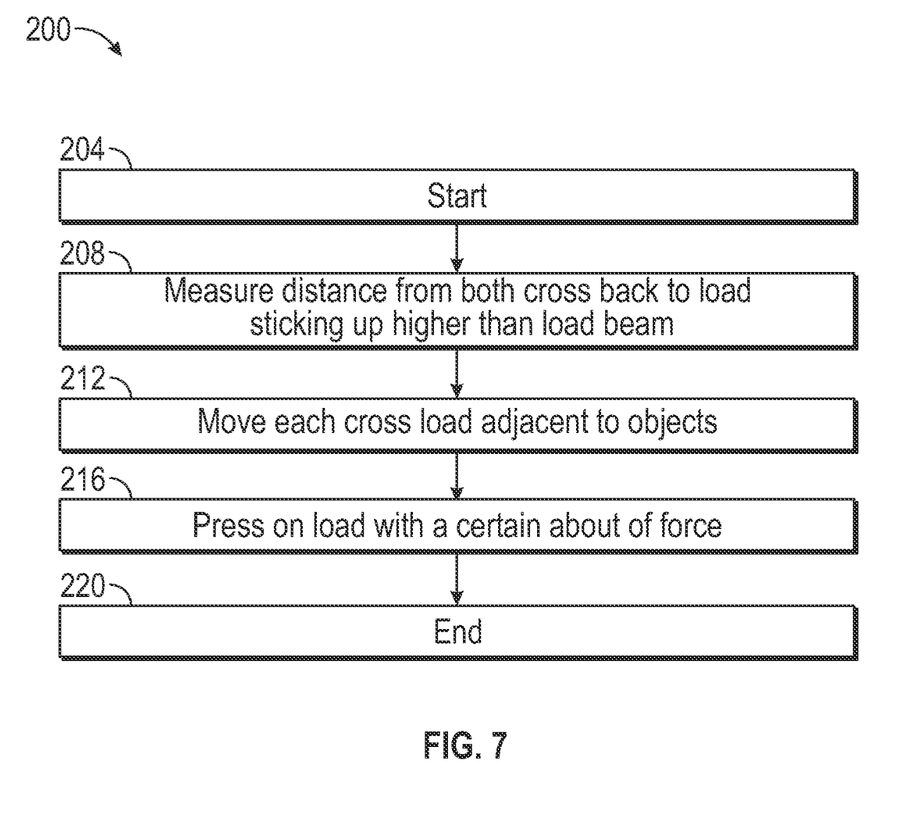
FIG. 7 illustrates a flow of a method of securing the load of FIG. 6 using the crossbars.

With reference now to FIG. 7 and continuing reference to FIG. 6, a method 200 of operating the crossbars 30, 32 can start at a step 204. Next, at a step 208, the method 200 measures a distance between the crossbars 30, 32 and the load L sticking up vertically past the crossbars 30, 32. The crossbars 30, 32 are then, at a step 212, moved closer to the load L. Next, at a step 216, the crossbars 30, 32 are pressed in against the load L. This pinches the load L between the crossbars 30, 32 and helps hold the load L. The method 200 ends at a step 220. In other examples, the crossbars 30, 32 move to a position adjacent the load L, but do not pinch the load L.

In the embodiment of FIG. 6, a camera 104 is also mounted to the crossbar 30. The example camera 104 includes a radar sensor. Field of view for the camera and its radar sensor can be changed by moving the crossbar 30 fore and aft within the vehicle 10. The camera 104 and its sensor can be used to facilitate positioning the crossbar 30 in a position appropriate for supporting the load L.

Figures 8, 9:
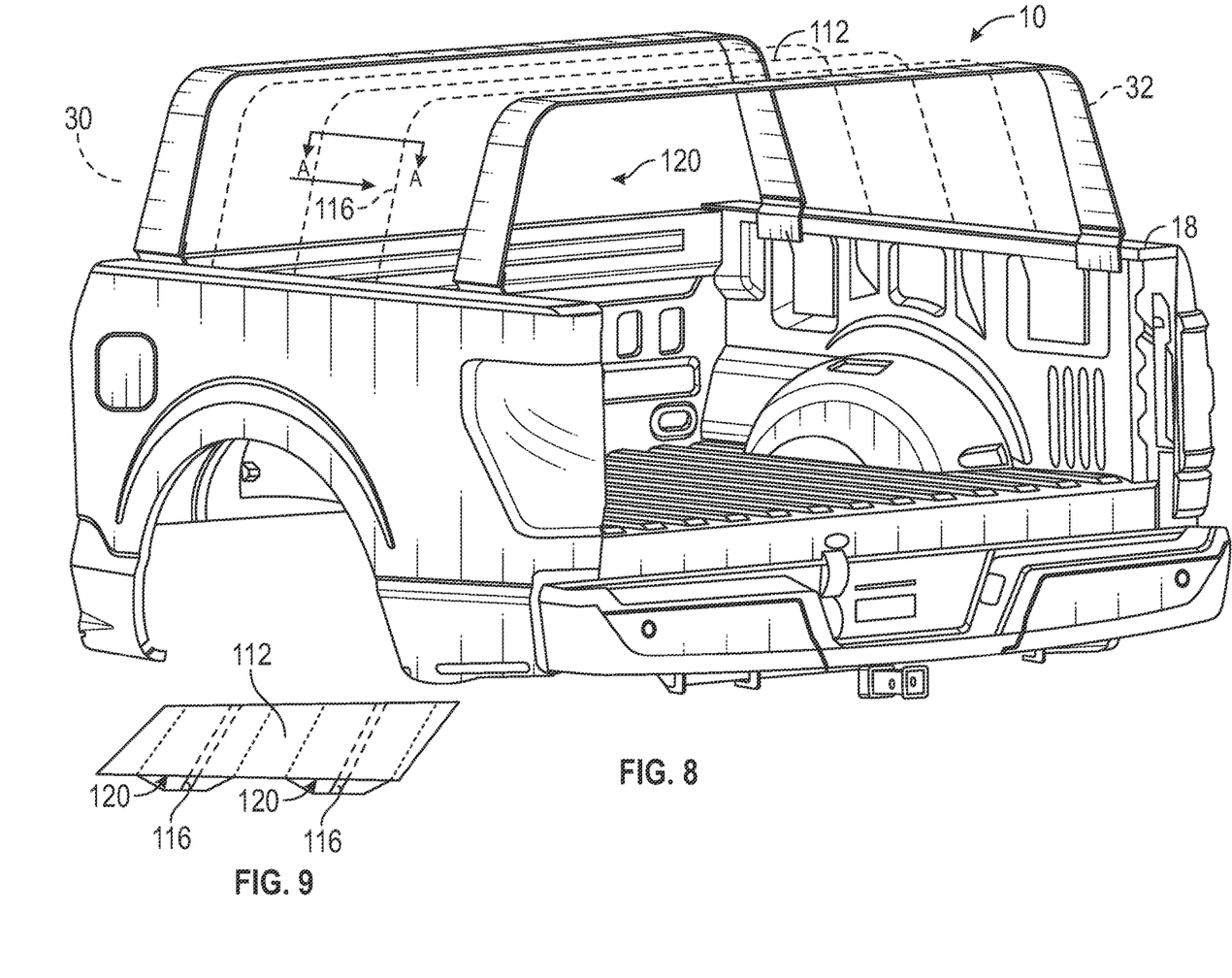
FIG. 8 illustrates a perspective view of the cargo bed and crossbars when the crossbars are supporting a tent.
FIG. 9 illustrates a section view at line 9-9 in FIG. 8.

Referring now to FIGS. 8 and 9, the crossbars 30, 32, in this example, are supporting a cover 112. The crossbars 30, 32 can move away from each other to expand the cover 112. The crossbars 30, 32 moved closer to one another to retract the cover 112. In some examples, the cover 112 can be expanded or retracted automatically in response to detecting a person moving toward or away from the vehicle 10. The cover 112 could be extended when no user is around the vehicle 10 in order to protect cargo within the cargo bed 18, for example. The cover 112 could also be extended and retracted in response to a sensor, such as a wiper rain sensor, detecting moisture. Extending the cover 112 during rain can protect cargo, for example.

The cover 112 can be a fabric, like ultra-high-molecular-weight polyethylene. The fabric can fold and unfold as the cover 112 is extended and retracted. The fabric can resist punctures, wear, wind resistance, mold and mildew.

In some examples, the cover 112 includes hook-and-loop fasteners to help hang or otherwise support items within an interior area of the cover 112 when the cover 112 is expanded. The cover 112 can support secure quarter-turn box-side mechanical fasteners (tool less attachment for security from theft), which can facilitate the user installing and removing the fasteners easily.

Internal bows 116, which can be contained in pockets 120 between two plies of cover 112 material, can help to maintain the shape of the cover 112 and protect the cover 112 from sags, wind, and abrasion. In some examples, the cover 112 can include a flap that extends downward from the crossbar 32 to cover an opening 120 to an interior of the cover 112.

Features of the disclosed examples include slidable crossbars that can be repositioned automatically to secure a load.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   a cargo bed of a vehicle;
   a first crossbar spanning the cargo bed;
   a second crossbar spanning the cargo bed, the first and second crossbar slidable relative to the cargo bed, the first and second crossbar slidable relative to each other to secure a load between the first and second crossbars, the load disposed within the cargo bed; and
   a control module and an actuator assembly, the control module configured to control the actuator assembly to reposition the first and second crossbars,
   wherein the actuator assembly is configured automatically position the first and second crossbars based on a position of the load.

2. The vehicle assembly of claim 1, further comprising:
   a passenger side rail mounted to a passenger side wall assembly of the cargo bed; and
   a driver side rail mounted to a driver side wall assembly of the cargo bed, wherein the first and second crossbars are each slidably coupled to both the driver side rail and the passenger side rail.

3. The vehicle assembly of claim 2, further comprising the passenger and driver side wall assemblies, wherein the passenger and driver side wall assemblies each have an inner side, an outer side, and an upper side, wherein the passenger side rail is mounted directly to the inner side of the passenger side wall assembly, wherein the driver side rail is mounted directly to the inner side of the driver side wall assembly.

4. The vehicle assembly of claim 3, wherein the passenger side rail and the driver side rail are disposed vertically beneath the upper sides of the passenger and driver side wall assemblies.

5. The vehicle assembly of claim 2, wherein the first and second crossbars are each slidable along the passenger and driver side rails between a forward position and a rearward position, the crossbars closer to a cab of the vehicle when the crossbars in in the forward position than when the crossbars is in the rearward position.

6. The vehicle assembly of claim 1, wherein the actuator assembly is configured to reposition the first and second crossbars to hold the load between the first and second crossbars.

7. The vehicle assembly of claim 6, wherein the first and second crossbars pinch the load to hold the load.

8. The vehicle assembly of claim 1, further comprising a cover connected to the first and second crossbars, the cover configured to expand as the first crossbar moves relatively away from the second crossbar, the cover configured to retract as the first crossbar moves relatively toward the second crossbar.

9. The vehicle assembly of claim 8, wherein the cover is fabric.

10. The vehicle assembly of claim 1, wherein the first and second crossbars have a U-shaped profile.

11. A vehicle assembly, comprising:
a cargo bed of a vehicle;
a first crossbar spanning the cargo bed;
a second crossbar spanning the cargo bed, the first and second crossbar slidable relative to the cargo bed, the first and second crossbar slidable relative to each other;
a control module and an actuator assembly, the control module configured to control the actuator assembly to reposition the first and second crossbars; and
a radar device configured to scan a load, the actuator assembly configured to reposition the first and second crossbars based at least in part on information from the radar device.

12. The vehicle assembly of claim 11, wherein the radar device is disposed on the crossbar.

13. A vehicle cargo bed load holding method, comprising:
slidably coupling a first crossbar to a passenger side rail and a driver side rail;
slidably coupling a second crossbar to the passenger side rail and the driver side rail;
sliding the first and second crossbars relative to each other to secure a load between the first and second crossbars, the load disposed within a cargo bed of a vehicle; and
automatically positioning the first crossbar and the second crossbar based on a position of the load.

14. The vehicle cargo bed load holding method of claim 13, further comprising pinching the load between the first and second crossbars.

15. The vehicle cargo bed load holding method of claim 13, wherein the sliding includes sliding both the first crossbar and the second crossbar.

16. The vehicle cargo bed load holding method of claim 13, further comprising supporting a cover on both the first and second crossbar, the cover expanding when the first and second crossbars move relatively away from each other, the cover retracting when the first and second crossbars move relatively closer to each other.

17. The vehicle cargo bed load holding method of claim 13, further comprising sliding the crossbars over a cargo bed of the vehicle when moving the crossbar between a forward position and a rearward position.

18. The vehicle cargo bed load holding method of claim 13, further comprising automatically sliding the first and second crossbars.

* * * * *